United States Patent
Lowder

(10) Patent No.: US 11,670,905 B2
(45) Date of Patent: Jun. 6, 2023

(54) METHODS TO MAINTAIN AND CONTROL THE POLARIZATION STATE FROM 3C OPTICAL FIBER

(71) Applicant: nLIGHT, Inc., Vancouver, WA (US)

(72) Inventor: Tyson Lowder, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 330 days.

(21) Appl. No.: 16/809,314

(22) Filed: Mar. 4, 2020

(65) Prior Publication Data
US 2020/0287345 A1  Sep. 10, 2020

Related U.S. Application Data

(60) Provisional application No. 62/814,114, filed on Mar. 5, 2019.

(51) Int. Cl.
*H01S 3/067* (2006.01)
*H01S 3/30* (2006.01)
*H01S 3/094* (2006.01)

(52) U.S. Cl.
CPC .......... *H01S 3/302* (2013.01); *H01S 3/06712* (2013.01); *H01S 3/06737* (2013.01); *H01S 3/094003* (2013.01)

(58) Field of Classification Search
CPC .. H01S 3/302; H01S 3/06712; H01S 3/06737; H01S 3/094003; H01S 3/06704; H01S 3/1603; G02B 6/105; G02B 6/14; G02B 6/4458
See application file for complete search history.

(56) References Cited

U.S. PATENT DOCUMENTS

| 5,343,543 A * | 8/1994 | Novak, Jr. ............. A61B 18/24 385/77 |
| 6,853,780 B1 * | 2/2005 | Brandi .................... G02B 6/443 385/103 |
| 7,424,193 B2 | 9/2008 | Galvanauskas |
| 9,397,466 B2 | 7/2016 | McComb et al. |
| 2006/0147166 A1 * | 7/2006 | Roba ....................... B65H 49/02 385/100 |
| 2009/0046746 A1 * | 2/2009 | Munroe .............. H01S 3/06758 359/328 |

(Continued)

OTHER PUBLICATIONS

Agrawal, *Nonlinear Fiber Optics*, Third Edition, chapters 6 and 10, 127 pages (2001).

(Continued)

*Primary Examiner* — Xinning(Tom) Niu
(74) *Attorney, Agent, or Firm* — Klarquist Sparkman, LLP

(57) ABSTRACT

Fiber laser amplification systems and methods are disclosed for use with a chirally coupled core (3C) optical fiber enabling the generation of a high-power output beam having a controlled stable polarization state. Vector modulation instabilities which typically induce undesirable sidebands in 3C fiber optics are greatly reduced even at high peak powers, enabling operation of the up to power levels limited mainly by stimulated Raman scattering (SRS). Polarization extinction ratios (PER) demonstrate long-term stability and minimal degradation due to changes in system temperature. Delays in reaching stable operation during start-up are also greatly reduced.

21 Claims, 15 Drawing Sheets

(56) References Cited

U.S. PATENT DOCUMENTS

| | | | | |
|---|---|---|---|---|
| 2010/0067923 A1* | 3/2010 | Arahira | ............... | G02F 1/3519 |
| | | | | 398/188 |
| 2012/0328252 A1* | 12/2012 | Howell | ............... | G02B 6/2555 |
| | | | | 385/98 |
| 2016/0013607 A1* | 1/2016 | McComb | ........... | H01S 3/10061 |
| | | | | 372/6 |
| 2017/0261832 A1* | 9/2017 | Cingoz | ................ | H01S 3/0675 |

OTHER PUBLICATIONS

Amans et al., "Vector modulation instability induced by vacuum fluctuations in highly birefringent fibers in the anomalous dispersion regime," *Optics Letters*, vol. 30, 11 pages (Feb. 24, 2005).

Hu, *Study and Control of Nonlinear Interactions in Large-Mode-Area Fibers*, PhD Dissertation, University of Michigan (2010).

Lowder, et al., "Long Term, True Single Transverse Mode, High Peak Power Operation of Large Mode 3C® Optical Fiber," Specialty Optical Fibers, OSA Advanced Photonics Congress, Paper #SoTu1G.6, 1 page (Jul. 2016).

\* cited by examiner

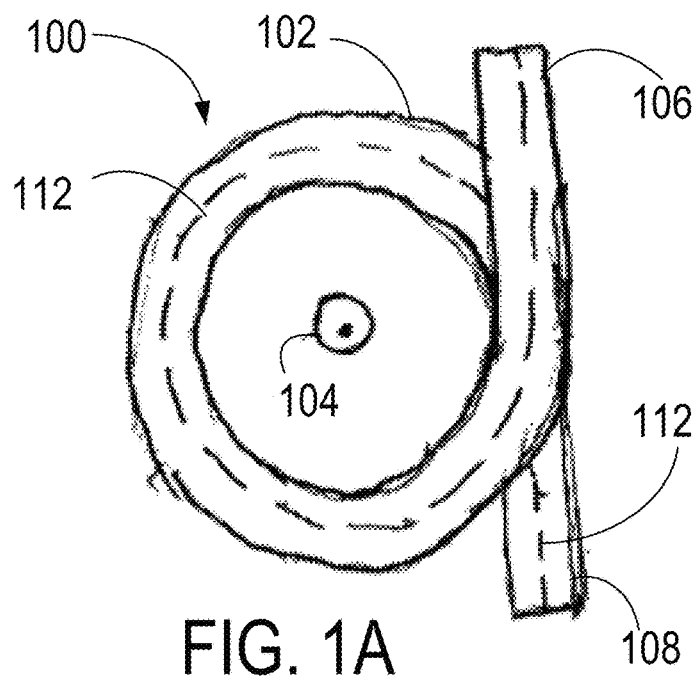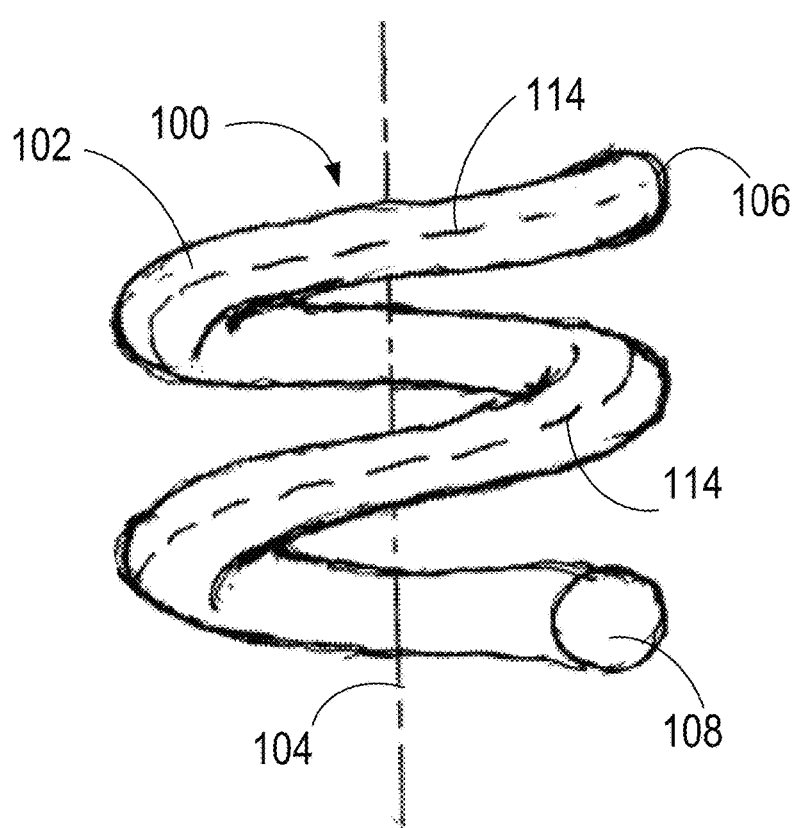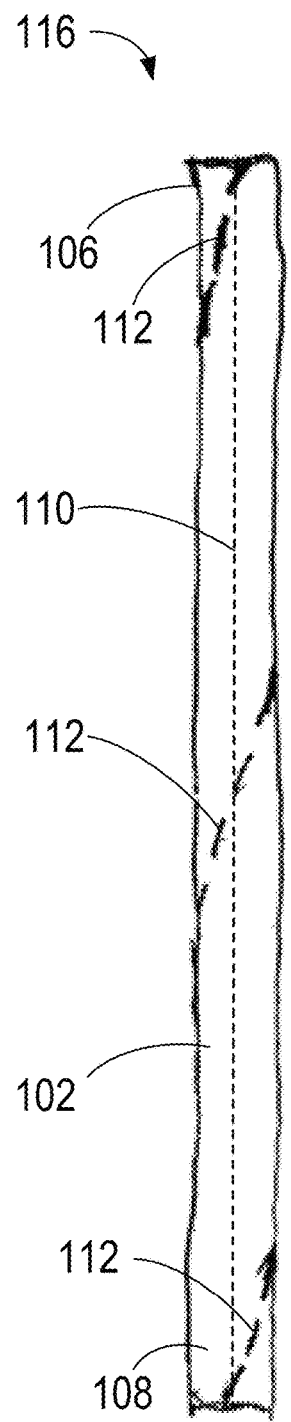

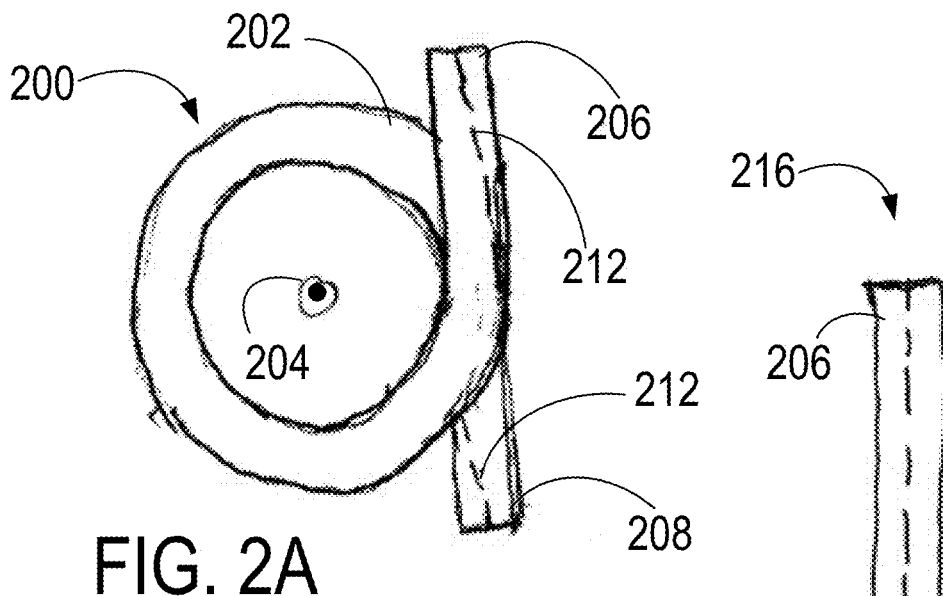
FIG. 2A
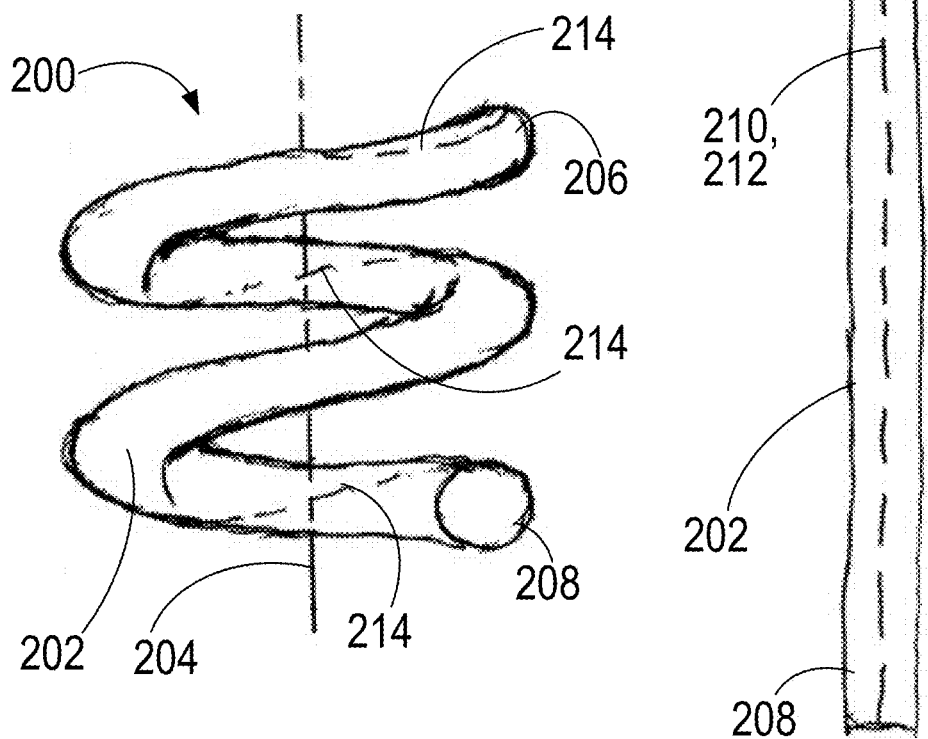
FIG. 2B
FIG. 2C

METHODS TO MAINTAIN AND CONTROL THE POLARIZATION STATE FROM 3C OPTICAL FIBER

CROSS REFERENCE TO RELATED APPLICATION

This application claims priority to U.S. Provisional Patent Application No. 62/814,114, filed on Mar. 5, 2019, which is incorporated herein by reference.

FIELD

The field is high power fiber-optical laser and optical amplification systems using chirally coupled core ("3C") optical fibers.

BACKGROUND

Laser systems have demonstrated a wide range of applications in materials processing, milling, and drilling across a number of manufacturing areas. The improved beam quality of optical fiber based laser amplification systems have further broadened the range of laser applications and improved the performance of pre-existing applications.

For many applications, it is desirable for laser systems, including 3C laser systems, to produce an output beam with a large polarization extinction ratio (PER) and with a stable polarization state that changes little or not at all over time to simplify system construction and integration in various applications without the need to accommodate polarization variability of the produced beam. In addition, frequency conversion applications are typically difficult to achieve without a high degree of control over polarization.

Thus, there is a need to combine these performance benefits of 3C fibers with improved control of beam polarization, especially with high powers that may extend up to limits imposed by nonlinear effects in the fiber, such as stimulated Raman scattering.

SUMMARY

According to an aspect of the disclosed technology, apparatus include a 3C fiber wound a number of turns about a coiling axis between an input end and an output end of the 3C fiber to form a 3C fiber coil such that a number of twists in the 3C fiber with the input end and output end extended to form a straight fiber configuration is smaller than the number of turns, wherein the input end is situated to receive a beam with an input circular polarization state and the wound 3C fiber is configured to amplify the beam to produce an amplified output beam with an output circular polarization state and to reduce a polarization state variability of the output circular polarization state based on the smaller number of twists and the input circular polarization state. In some examples, the 3C fiber includes an actively doped core configured to amplify an input beam propagating from the input to the output end. Some examples further include a seed source optically coupled to the input end of the 3C fiber and configured to generate a seed beam that becomes the amplified output beam and/or a pump source optically coupled to the input end and/or the output end of the 3C fiber and configured to optically pump the actively doped core of the 3C fiber and/or an input polarization converter including a half-wave plate situated to receive the seed beam and to adjust an angle of a linear polarization state of the seed beam and including a quarter-wave plate situated to receive the seed beam with the angled-adjusted linear polarization state and to change the linear adjusted polarization state to the input circular polarization state. Some examples can include a polarization maintaining fiber situated to receive the seed beam from the seed source and to direct the seed beam to the input polarization converter, including in further examples where the input polarization converter is fiber spliced at an input end to the polarization maintaining fiber and at an output end to the input end of the 3C fiber. Some examples can include an output polarization converter including a quarter-wave plate situated receive the amplified output beam and to change the output circular polarization state of the amplified output beam to a linear polarization state and including a half-wave plate situated to receive the amplified output beam with the linear polarization state and to adjust an angle of the linear polarization state of the amplified output beam. Representative examples include an optical fiber rotator coupled to at least one of the input end or the output end of the 3C optical fiber and configured to rotate the corresponding input end or output end to selectively vary the number of twists. In some embodiments the 3C fiber coil is a right-handed coil, and in other embodiments the 3C fiber coil is a left-handed coil. In some examples, the 3C fiber includes a reference marking on an exterior surface of the 3C fiber between the input end and the output end to provide an indication of a twisting of the 3C fiber. According to some examples, the number of turns is one or greater, and the number of twists is zero, and in other examples a number of quasi-twists of the 3C fiber in the 3C fiber coil is uniformly provided between the input end and output end. In some embodiments, the polarization state variability corresponds to a time-dependent variation in polarization extinction ratio during an optical pulse and/or over multiple optical pulses. Some embodiments include a subsequent gain stage coupled to the amplified output beam that is configured to amplify the amplified output beam. Selected examples can also include a non-linear optical element situated to receive the amplified output beam and to produce a non-linearly converted optical beam.

According to another aspect of the disclosed technology, methods include coupling a circularly-polarized input beam into a 3C fiber wound a number of turns about a coiling axis between an input end and an output end of the 3C fiber to form a 3C fiber coil such that a number of twists in the 3C fiber with the input end and output end extended to form a straight fiber configuration is smaller than the number of turns, and amplifying the input beam having the input circular polarization state to produce an amplified output beam with an output circular polarization state having a polarization state variability based on the smaller number of twists and the input circular polarization state. Some method examples further include adjusting the number of twists to reduce the polarization state variability of the amplified output beam. Additional method examples include optically pumping the 3C fiber with a pump source.

The foregoing and other objects, features, and advantages of the disclosed technology will become more apparent from the following detailed description, which proceeds with reference to the accompanying figures.

BRIEF DESCRIPTION OF THE DRAWINGS

FIGS. 1A-1B show a plan view and side view, respectively, of a coiled fiber having twist.

FIG. 1C shows a side view of the fiber from FIGS. 1A-1B after stretching the fiber by extending opposite ends.

FIGS. 2A-2B show a plan view and a side view, respectively, of a coiled fiber without twist.

FIG. 2C shows a side view of the fiber from FIGS. 2A-2B after being stretched out.

DETAILED DESCRIPTION

Chirally Coupled Core Optical Fibers

Figure 19A:
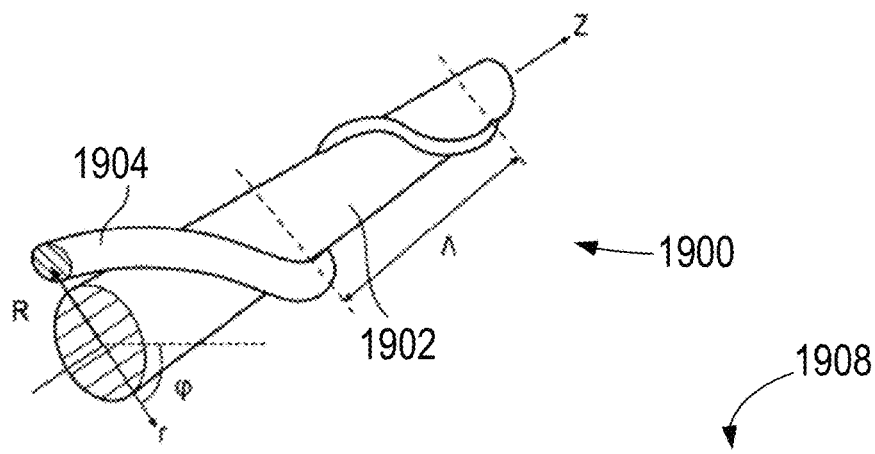
FIGS. 19A-19C show examples of 3C optical fibers.
Figure 19B:
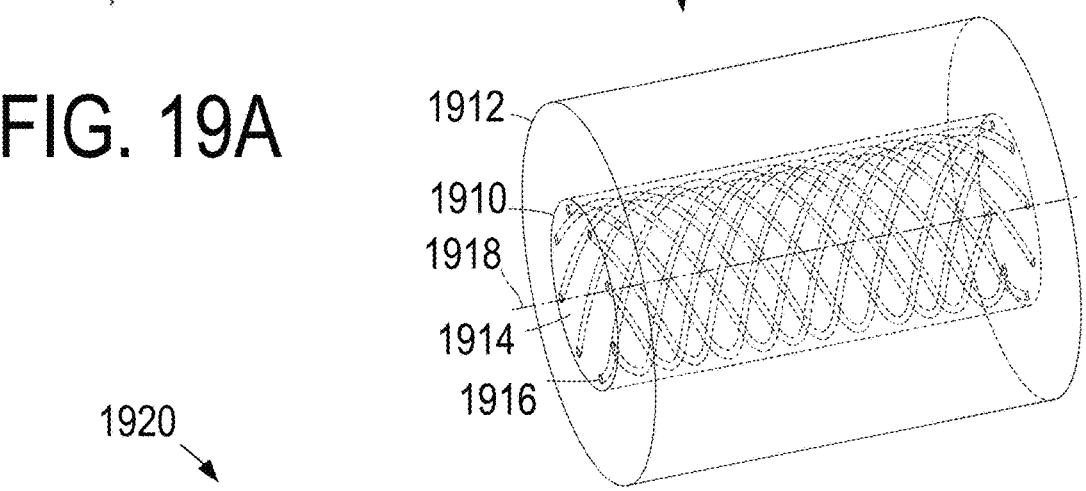
Figure 19C:
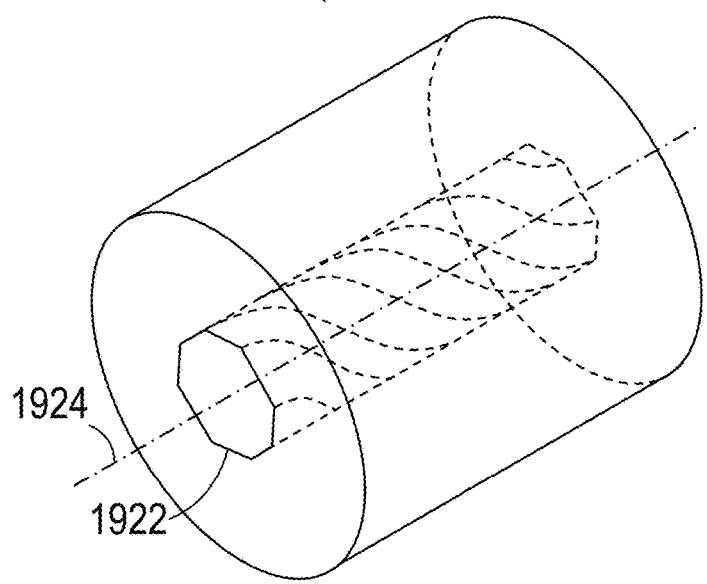

Herein, chirally coupled core fibers are referred to as "3C" fibers, with various examples being found in, e.g., U.S. Pat. Nos. 7,424,193, 9,217,825, 9,397,466, and 9,784,913, incorporated by reference herein. 3C fibers generally include periodic azimuthal rotational variation along the length of the fiber, such as a satellite core spiraling around a central core or a rotated core structure, by way of example. In many embodiments, the characteristics of the azimuthal rotational variation, such as cross-section, core diameter, length periodicity of the azimuthal rotation, etc., can be configured to provide optical loss for selected modes (such as higher order modes). In particular examples, 3C fibers can include actively doped cores configured to produce substantial optical amplifications with (or near) diffraction limited beam quality and large mode filed diameters. Laser systems using 3C fibers can produce beams for various applications, such as high powered pulses applications. The manufacturing processes for 3C fibers typically involves rapid spinning (360° over a few mm in fiber length) to generate the internal spiral or rotated structure. The manufacturing processes generally prevent implementation of traditional in-fiber polarization-maintaining structures due to the internal rotated structure that is produced. Examples of 3C fibers are shown in FIGS. 19A-19C. FIG. 19A is a 3C fiber 1900 having a central core 1902 with a satellite core 1904 wound about the central core 1906, with cladding, jacketing, and other features omitted for clarity. FIG. 19B is a 3C fiber 1908 including a round core 1910 and cladding 1912. A mode-propagating region 1914 and a mode discriminating region 1916 are situated in the core and are rotated about a propagation axis 1918. FIG. 19C is a 3C fiber 1920 with a non-circular core 1922 (octagonal as shown) that is rotated along an optical axis 1924.

Thus, in some embodiments, the refractive index profile of the core can vary angularly about the propagation axis of the waveguide. As used herein, the term "refractive index profile" refers to the refractive index distribution in a transverse plane of a waveguide having a radial coordinate and an azimuthal (i.e., angular) coordinate. As used herein, angular variation refers to change in the refractive index profile of a waveguide as a function of the azimuthal coordinate in the transverse plane of the waveguide. The refractive index profile can be angularly symmetric about the propagation axis or asymmetric. The refractive index profile can also vary radially about the propagation axis of the waveguide. In some embodiments, the refractive index profile can vary radially and angularly about the propagation axis of the waveguide. In this manner, the waveguide can be configured to transmit a particular linearly polarized (i.e., LP) mode, such as the fundamental mode $LP_{01}$, while discriminating against the propagation and/or generation of higher order modes such as the $LP_{11}$ mode, the $LP_{21}$ mode, etc. Modal discrimination can also be caused by, for example, absorption and/or attenuation of a particular mode or modes to be discriminated against. The variation of the refractive index of the waveguide across the transverse plane can be stepped or graded. In some embodiments, a graded refractive index profile can be approximated by a series of steps.

In some embodiments, the refractive index profile of the core can vary angularly along a length of the propagation axis. The angular refractive index profile variation can be periodic or aperiodic along the propagation axis. For example, the angular refractive index profile variation can be sinusoidal or otherwise have a fixed spatial frequency. Periodic variation can also include a plurality of variations with different periods, such as a chirped spatial frequency that increases or decreases along the propagation axis. Such variations are referred to herein as quasi-periodic. Aperiodic refractive index profile variations can include variations along the length of the propagation axis that do not have a regular spatial relationship, such as random variations. In the case of an optical waveguide such as a fiber, such angular variation of the refractive index profile along the propagation axis can be created by, for example, rotating the fiber preform during the drawing process.

The refractive index profile of the core can also vary radially along the length of the propagation axis. Such radial variation can be periodic, aperiodic, or quasi-periodic. Radial variation of the refractive index profile along the propagation axis can be created by, for example, radially varying the refractive index profile of the core rod preform during fabrication.

Coil Configurations with Twist

Twist is defined herein as a rotation of an input end of an as-fabricated optical fiber (such as a 3C fiber) relative to an output end of the optical fiber about a longitudinal axis of the optical fiber with the optical fiber extended into a straight configuration. The longitudinal axis of the optical fiber is defined as having a direction perpendicular to cross-sections of the fiber at every point along the length of the fiber, wherein the axis of the optical fiber passes through a center of each cross-section of the fiber. Thus, for an optical fiber in a straight configuration with the input end and output ends free to rotate to relaxed positions, the optical fiber would be free of twist (even if an internal structure is spiral or periodically rotated, such as with 3C fibers), if a reference line (real or imaginary) is straight as extending between the input end and output end on a surface of the optical fiber. An optical fiber having twist includes an optical fiber in a straight configuration with input end and output end constrained relative to each other such that a reference line spirals between the input end and output end. Quasi-twist refers to a spiral appearance of a reference line on a fiber coil, where in some examples, such a reference line would be straight with the input end and the output end of the optical fiber extended into a straight configuration.

FIG. 1A shows a two-turn coil 100 having twist for an optical fiber 102 wound about a winding axis 104 from an input end 106 of the optical fiber 102 to an output end 108. As shown in the side view of FIG. 1B, the two-turn coil 100 winds in a clockwise direction around the winding axis 104 while coiling downwards, as shown in the side view of FIG. 1B (this corresponds to right-handed winding circularity). Input end 106 can include an input optical fiber facet, fiber splice, or other optical coupler through which light, such as a seed beam, is directed to become coupled into the optical fiber 102 to propagate along a direction generally corresponding to a longitudinal axis 110 of the optical fiber 102. The longitudinal axis 110 typically corresponds to a center position of a cross-section of the optical fiber 102, so that the longitudinal axis 110 curves as the optical fiber 102 is coiled. The output end 108 can include an output face, output fiber splice, or other optical coupler for emission of an output beam, such as an amplified seed beam.

A dashed reference line 112 on an upper surface of the optical fiber 102 in FIG. 1A shows that for the two-turn coil 100, as wound, the dashed reference line 112 of the optical fiber 102 remains on the upper surface as the process of forming the two-turn coil 100 bends the optical fiber 102 within the plane of the two-turn coil 100 (e.g., the horizontal plane of the drawing in FIG. 1A). In FIG. 1B, a dashed reference line 114 is shown along an outer surface of the two-turn coil 100—in this case, the dashed line 114 is on the outer surface along the entire length of the two-turn coil 100. In typical optical fiber examples, the dashed reference lines 112, 114 form straight lines along any length of the optical fiber 102 that is allowed to freely extend into a straight, unbent, untwisted position with the input end 106 and output end 108 also allowed to relax and rotate freely. FIG. 1C shows the optical fiber 102 now stretched out in a straight configuration 116 (undoing the coil structure) but with no rotation of the input end 106 and output end 108 relative to each other during this stretching out process. The dashed reference line 112 is seen to wrap around optical fiber 102 two times, corresponding to the two turns of the two-turn coil 100 in FIGS. 1A-1B, illustrating that the process of winding the two-turn coil 100 has also induced a twisting in the optical fiber 102, with one twist (a 360° clockwise rotation around the axis of the optical fiber 102, viewed looking along optical fiber 102 from the input end 106 to the output end 108) for each 360° turn of the coil (a 360° clockwise wrapping of the fiber around the coil winding axis 104). This induced twist of the optical fiber 102 can induce undesirable polarization instabilities through induced circular birefringence, particularly at large amplifications of optical pulses of short duration. A left-handed coil (counter-clockwise rotation around the coil winding axis) would similarly have a counter-clockwise twisting.

Coil Configurations with Changed Twist

FIGS. 2A-2B show a two-turn coil 200 of an optical fiber 202 wound about a coiling axis 204 such that the optical fiber 202 does not have a twist when extended straight. As shown in FIG. 2A, the two-turn coil 200 has right-handed wind circularity. An input end 206 of the optical fiber 202 can correspond to an input fiber facet, fiber splice, or other optical coupling for light, such as a seed beam, that becomes amplified by propagation in the optical fiber 202, to be coupled into the optical fiber 202 to propagate along a direction generally corresponding to a longitudinal axis 210 of the optical fiber 202. An output end 208 of the optical fiber 202 can include an output fiber facet, an optical splice, or other optical coupling for emission of an output beam, such as a high-energy amplified seed beam. A dashed reference line 212 is shown on an upper surface of the optical fiber 202 at the input end 206 and at the output end 208 in FIG. 2A. For the two-turn coil 200 as wound, the dashed reference line 212 does not lie at a common radial position relative to the coiling axis 204 on the upper surface between input end 206 and output end 208 (compare with FIG. 1A). In FIG. 2B, a dashed reference line 214 is shown along a side surface of the optical fiber 202 for the two-turn coil 200 wound with a right-handed circularity. FIG. 2C shows the optical fiber 202 now stretched out into a straight configuration 216 but with no rotation of the input end 206 and output end 208 relative to each other during this stretching out process. The dashed reference line 214 extends straight along optical fiber 202 with no twist, so as to be parallel (or collinear) to the longitudinal axis 210 and so as to appear on the same side of the optical fiber 202 as shown (compare with FIG. 1C).

To provide an absence of twist when extended into the straight configuration 216 in examples, where a reference line (such as the dashed reference line 214) has a common radial position in a uniform diameter coil, the input end 206 of the optical fiber 202 in the two-turn coil 200 can be rotated clockwise two turns (720°) to produce a quasi-twisting in the coiled state resulting in the dashed reference line 212 or 214 having a variable radial distance relative to the coiling axis 204. The rotations can be provided during winding or structuring of the two-turn coil 200 (including after the two-turn coil 200 is wound). In other examples, the output end 208 can be rotated or both the input end 206 and the output end 208 can be rotated relative to each other. In left-handed fiber coil examples, the quasi-twist of the optical fiber along the left-handed coil can include a number of counter-clockwise rotations corresponding to the number of turns of the left-handed coil. In some examples, a number of twists is selected to be provided in the optical fiber when extended into a straight configuration that is less than the number of turns but is not zero.

In representative examples, the rotation or quasi-twisting of the optical fiber 202 in the two-turn coil 200 can be provided uniformly or substantially uniformly along the length of the optical fiber 202 of the two-turn coil 200. In additional examples, the quasi-twisting of the optical fiber 202 can occur non-uniformly along the length of the two-turn coil 200. It will be appreciated that the selection of two as the number of turns for the two-turn coil 200 is only used for convenience of illustration and explanation. More or fewer turns than two can be used in different fiber coil examples, and the number of turns need not be an integer. In typical examples, by reducing or eliminating the twist observed in the straight configuration 216, undesirable polarization state instabilities observed an amplified output beam emitted from the two-turn coil 200 may be also reduced or eliminated. In typical 3C fiber examples, a length-wise period of internal azimuthal rotation of a core and/or satellite core is substantially smaller than a diameter of the optical fiber wound about the coiling axis 204. By way of example, length-wise periods for 3C fibers can range from 0.5 mm to 20 mm, and more typically 2 mm to 10 mm. By way of example, fiber coil diameters can be 100 mm to 1 m, and more typically 150 mm to 500 mm. Thus, in representative examples, there are a large number of length-wise internal 3C rotational periods in each coil turn.

In some embodiments, the chirally coupled core (3C) optical fiber may have a uniform twist from the input end of the fiber to the output end of the fiber. In some embodiments, portions of the fiber may have a clockwise twist and other portions of the fiber may have a counter-clockwise twist. In some embodiments, the combined twists in clockwise and counter-clockwise portions may combine to produce zero total twist from the input end of the fiber to the output end of the fiber. In some embodiments, the combined twists in clockwise and counter-clockwise portions may combine to produce a non-zero total twist from the input end of the fiber to the output end of the fiber. In some examples, coiling axes can be curved or bent. In further examples, a coil diameter can be variable (e.g., forming a conical coil or other shape rather than cylindrical). The spacing along the coiling axis between coil turns can be uniform or variable, and can be large (e.g., similar to a stretched spring) or small (e.g., similar to a compressed spring).

Polarization Extinction Ratio Dependence on Signal Peak Power

Figure 3:
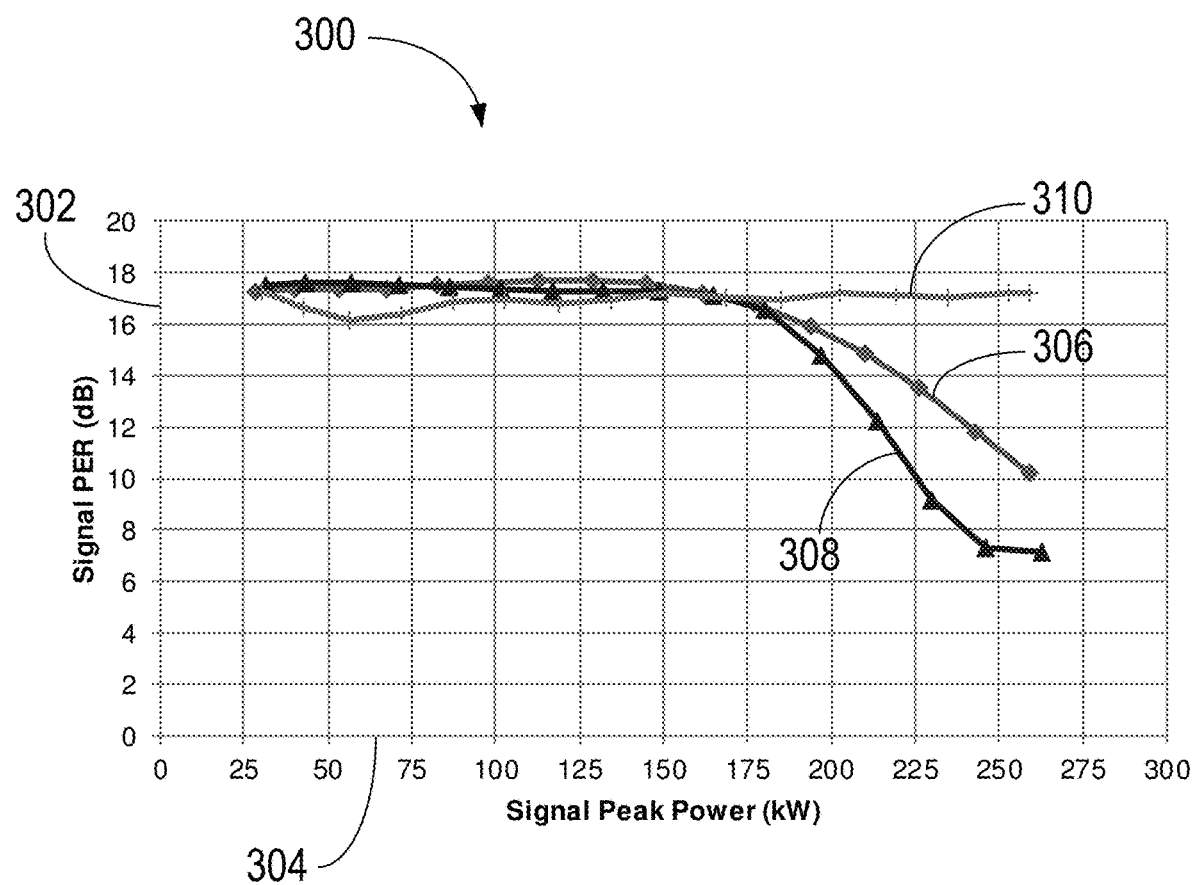
FIG. 3 is a graph of the polarization extinction ratio (PER) against signal peak power for various input launches.

FIG. 3 is a graph 300 of a polarization extinction ratio (PER) 302 against a signal peak power 304 of different amplified output beams produced in a 3C fiber coil with various linearly- and circularly-polarized input launch states of input seed beams. A curve 306 corresponds to a fast-axis aligned (horizontal) linear polarization launch, a curve 308 corresponds to a slow-axis aligned (vertical) linear polarization launch, and a curve 310 corresponds to a circularly-polarized launch. In 3C fiber coils (and in contrast to PM fibers), a fast-axis can generally correspond to an axis parallel to a plane of the fiber coil, and a slow-axis can generally correspond to an axis parallel to a coiling axis for the same fiber coil. All three curves 306, 308, and 310 maintain a relatively constant signal PER up to approximately 180 kW of signal peak power, the signal PER ranging from 16 dB to 18 dB. Above approximately 180 kW signal peak power, both the fast- and slow-axis linear polarization state launches produce output beams having a drop-off in signal PER, indicating the onset of destabilizing effects which degrade both the purity and polarization angle (azimuth) as the signal peak power of the output beam increases up to approximately 260 kW. The output beam produced with the slow-axis launch is seen to degrade somewhat faster than the output beam produced with the fast-axis launch. Multiple measurements for both the fast- and slow-axis launches were made, with similar results. All measurements are made after an initial "warm-up" period (see FIGS. 12-19).

In contrast with curves 306 and 308 for linear launches, curve 310 for a circular launch shows an absence of a drop-off in signal PER in the output beam, even up to 300 kW (values above 260 kW are not shown). Thus, an advantage of a circular launch includes increasing the achievable maximum signal peak powers, including in some examples by 120 kW (~67%, from about 180 kW up to about 300 kW) over signal peak powers attainable with linear polarizations along either the fast- or slow-axes. In representative examples herein, a circular polarization launch state is used for an input beam coupled into a 3C fiber coil, and the 3C fiber coil is configured twist such that an extension of the 3C fiber of the 3C fiber coil into a straight configuration exhibits reduced or an absence of twist, as discussed in various examples herein. The combination of circular polarization launch and reduced twist can be used to further improve polarization state stability of a generated output beam at higher optical amplifications.

Signal Peak Power Dependence on Wavelength

Figure 4:
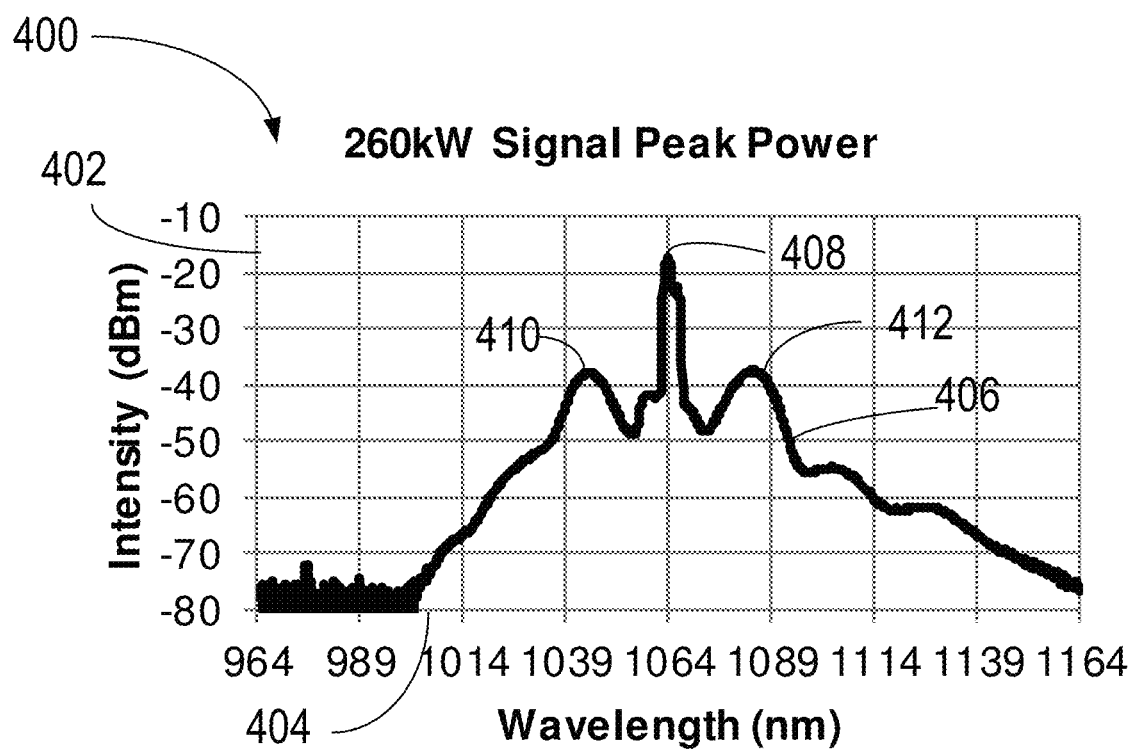
FIGS. 4-6 are graphs of signal peak power against wavelength for a fast-axis launch, a slow-axis launch, and a circular launch, respectively.

FIG. 4 is a graph 400 of intensity 402 against a wavelength 404 for an amplified output beam produced with an input beam launched into a 3C fiber coil with a linear polarization state aligned with a fast-axis of the 3C fiber, resulting in a peak power in short duration pulses (e.g., about 40 ps) of the amplified output beam of approximately 260 kW. A curve 406 shows the relationship between signal intensity (on a logarithmic dBm scale) and the wavelength (nm) at an output of the 3C fiber. The signal power is maximum at a peak 408 at a wavelength of approximately 1064 nm, and prominent sidebands 410, 412 are present at wavelengths below and above the peak 408, respectively. The sidebands 410, 412 can arise from vector modulation instability (VMI). VMI is an effect arising from four-wave interactions (two photons at the frequency ω create two photons at ω±Ω, corresponding to the symmetry of the wavelength position of the sidebands 410, 412 (separated by ±2πc/Ω) relative to the wavelength position of the peak 408.

Figure 5:
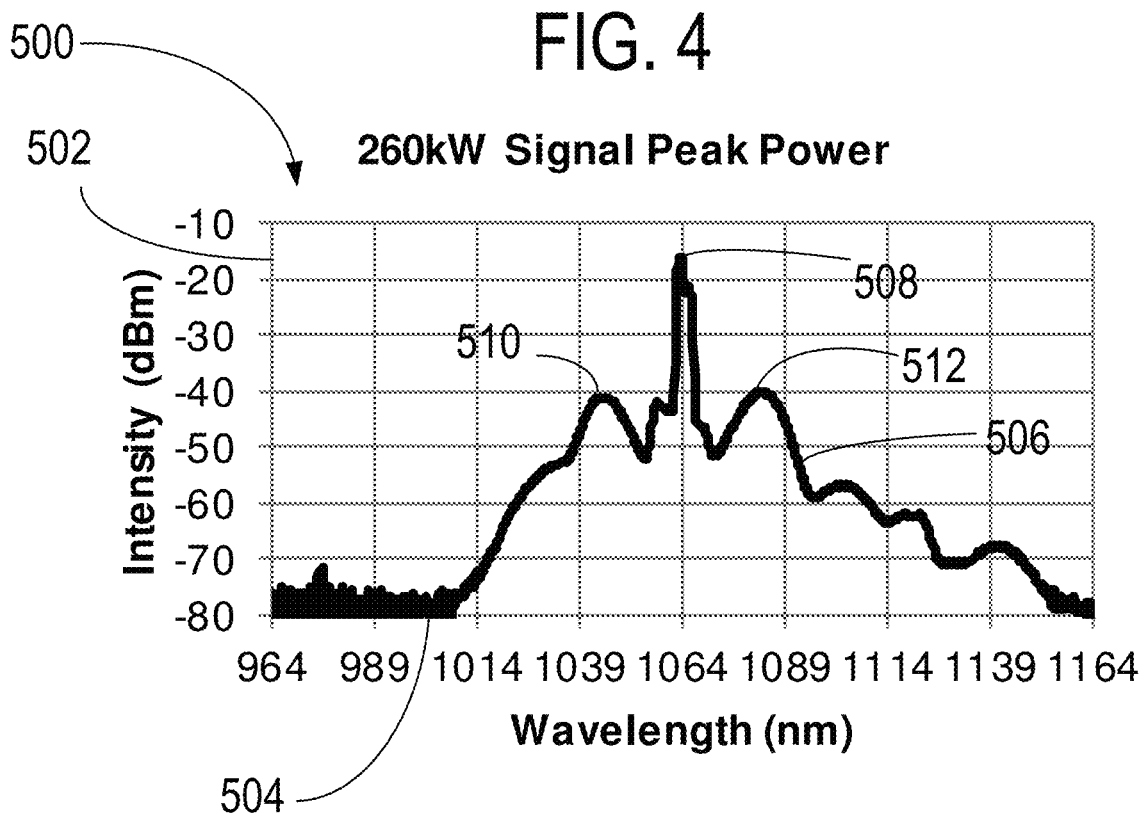

FIG. 5 is a graph 500 of output beam intensity 502 against a wavelength 504 for an amplified output beam produced with an input beam launched into a 3C fiber coil with a linear polarization state aligned with a slow-axis of the 3C fiber, producing in the output beam a peak power of approximately 260 kW (similar to FIG. 4). A curve 506 shows the relationship between signal intensity (on a logarithmic dB scale) and the wavelength (nm) content of the amplified output beam. As in FIG. 4, the signal power is concentrated at a peak 508 at about 1064 nm, though prominent sidebands 510, 512 at wavelengths below and above the wavelength of the peak 508 are also shown. The wavelengths of the sidebands 510, 512 are approximately the same as the wavelengths of the sidebands 410, 412 in graph 400. Similarly, the sidebands 510, 512 are understood to be formed through VMI. Curves 412 and 512 are very similar.

Figure 6:
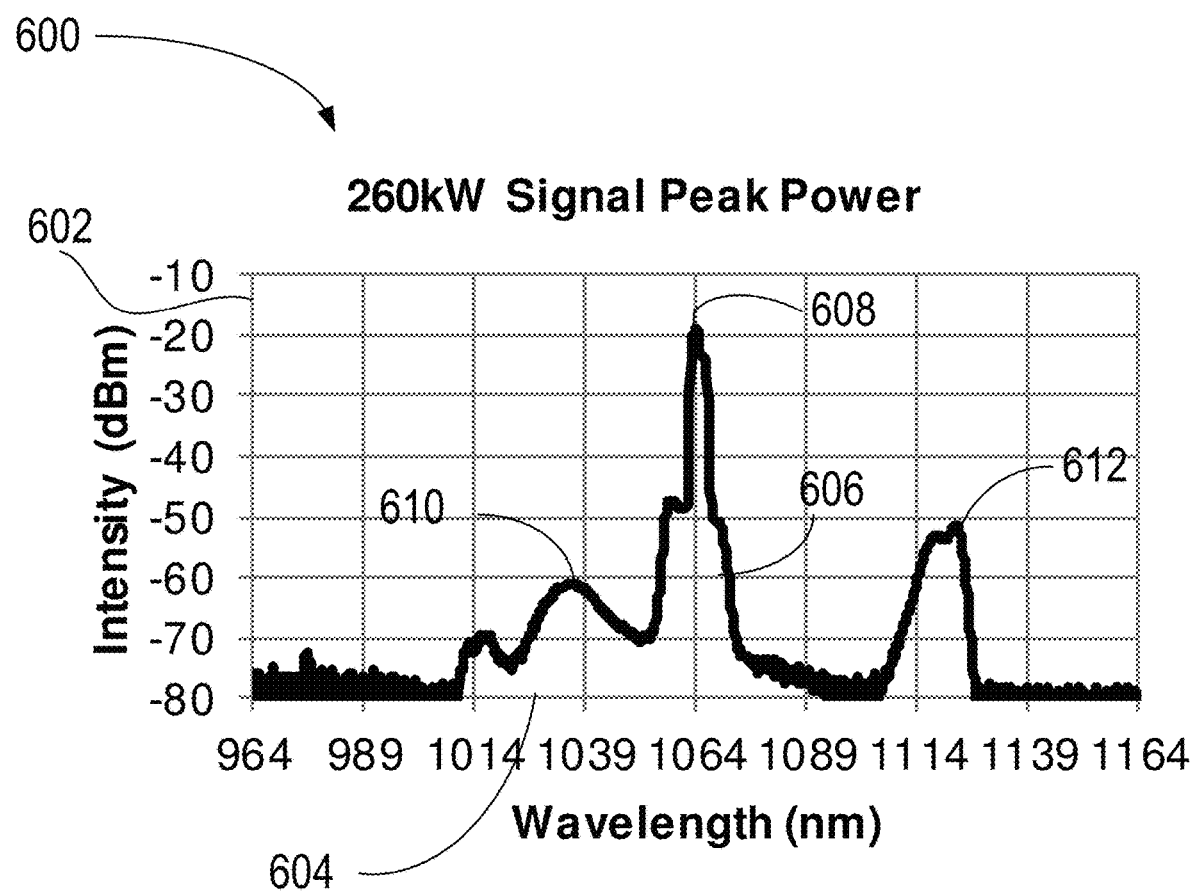

FIG. 6 is a graph 600 of an output beam intensity 602 against a wavelength 604 for an amplified output beam that is produced using an input beam launched into a 3C fiber coil with a circular polarization state, resulting in an amplified output beam having a peak power of approximately 260 kW. A curve 606 shows the relationship between signal intensity (on a logarithmic dB scale) and the wavelength (nm) content of the amplified output beam at the output of the 3C fiber coil. As in FIGS. 4-5, the signal power is concentrated at a peak 608 at approximately 1064 nm. However, in contrast with graphs 400, 500, differences between sideband and peak intensities are larger, resulting in an intensity difference of over 40 dBm between the peak 608 and sideband 610 and an intensity difference of over 30 dBm between the peak 608 and sideband 612. By comparison, the difference between the peak 408 and the sidebands 410, 412 was each about 20 dBm, and the difference the peak 508 and the sidebands 510, 512 was about 25 dBm. Also, the wavelengths for the peaks of the sidebands 610, 612 are farther from the peak 608, relative to the distance between the peaks 408, 508 and the respective sidebands 410, 412, 510, 512.

Polarization Extinction Ratios During Turn on

Figure 7:
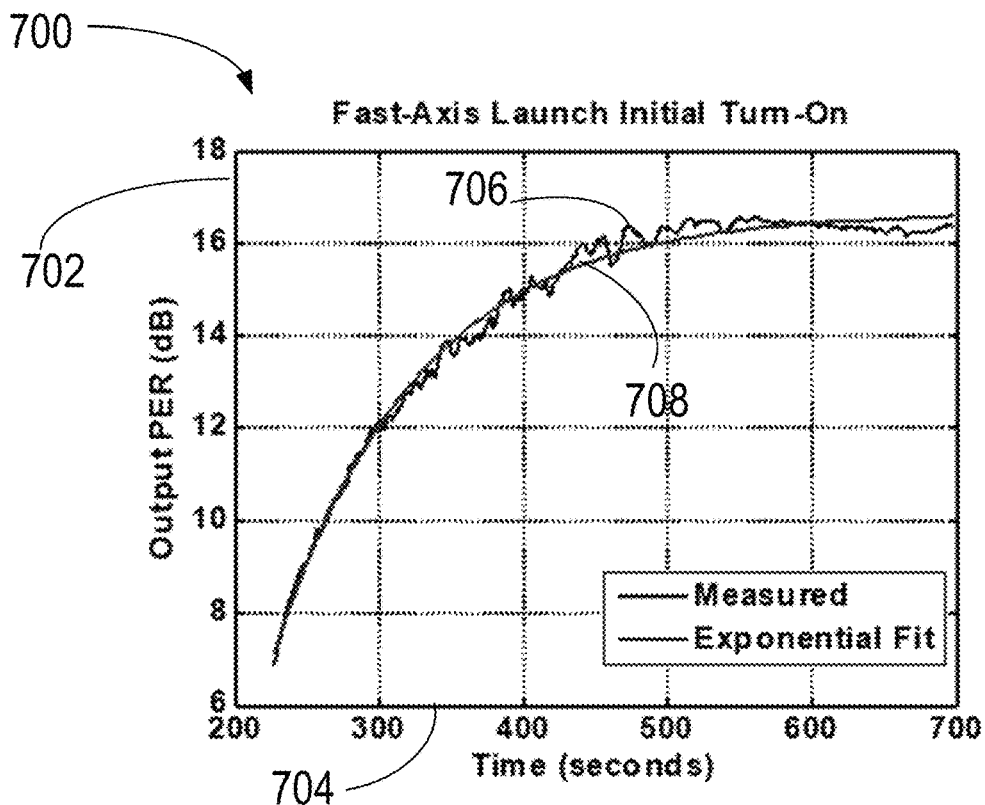
FIGS. 7-8 are graphs of output PER against time for a fast-axis launch turn on and a circular launch turn on, respectively.

FIG. 7 is a graph 700 of an output PER 702 against time 704 for a fast-axis aligned linear polarization input beam launch from a cold state (i.e., the device is turned on after being off for a long period). Measured data is shown by a curve 706. A curve 708 is an exponential fit to the curve 706. With the fast-axis launch, about 10 minutes (600 s) of stabilization time transpires before the PER reaches an asymptotic level above 16 dB. Based on the stabilization timescale and curve shape, the stabilization has the appearance of temperature-dependence. Similar stabilization times are found for slow-axis launches.

Figure 8:
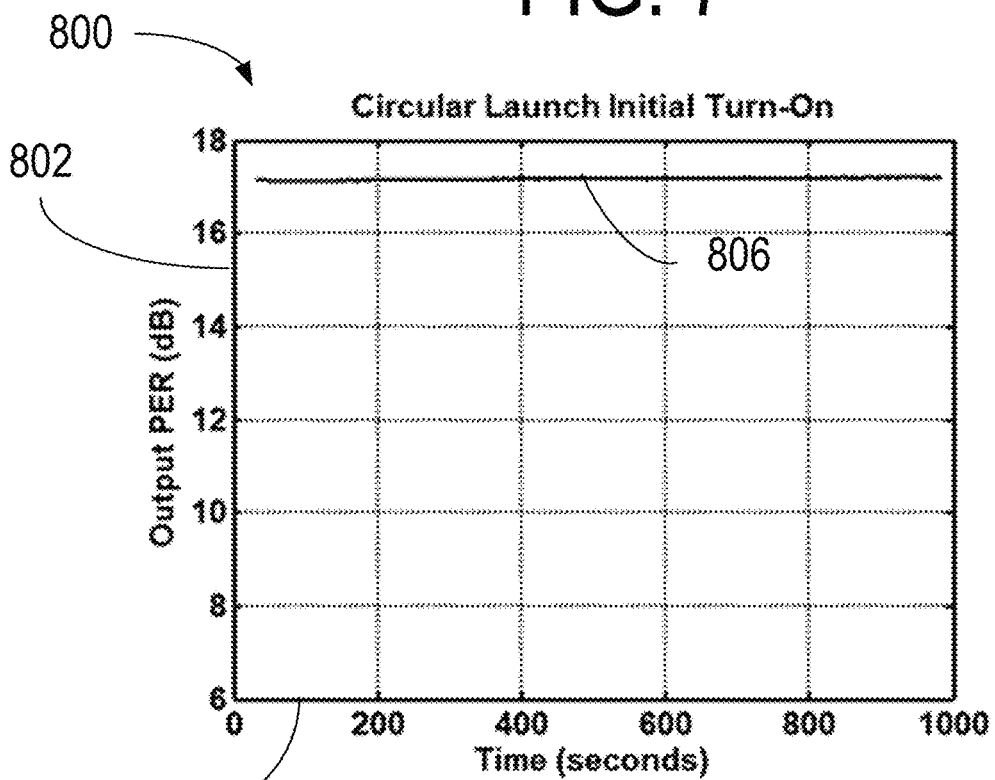

FIG. 8 is a graph 800 of an output PER 802 against time 804 for a circular polarization launch of an input beam into a 3C fiber coil situated in a cold state (i.e., the device is turned on after being off for a long period). Measured data is shown by an output curve (in dB) 806, showing a constant PER at slightly over 17 dB starting immediately upon powering up the device, and showing an absence of the stabilization characteristics associated with input beams launched with fast- and slow-axis linear polarization alignments.

Initial Stabilization of Polarization Extinction Ratios—Fast-Axis Launch

Figure 9:
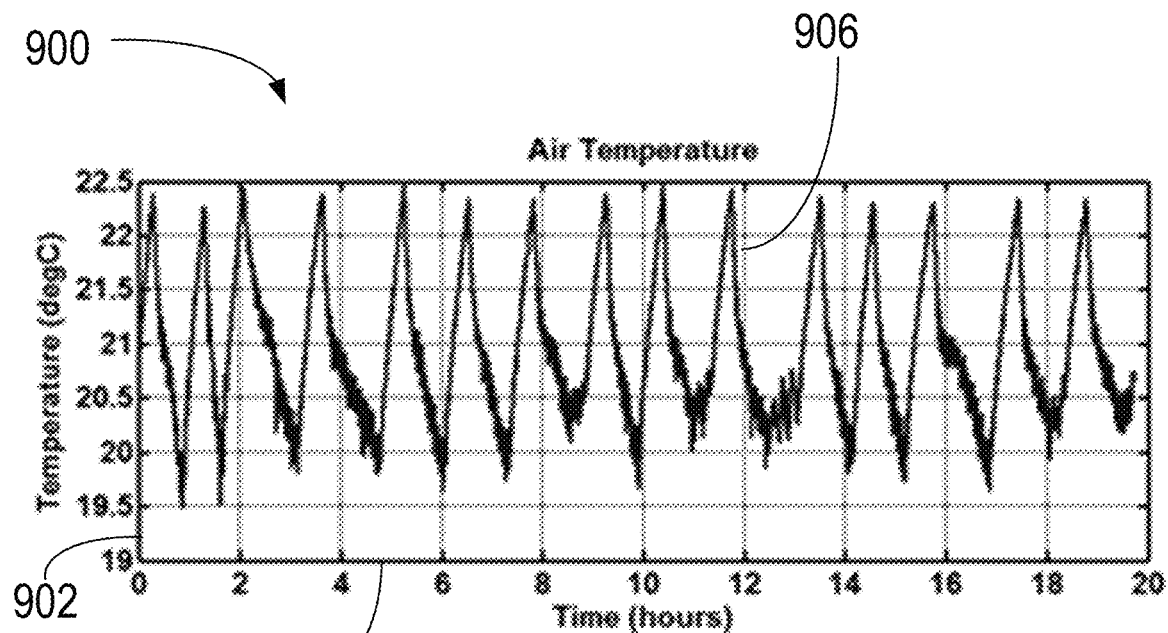
FIG. 9 is a graph of air temperature against time for a fast-axis launch at 180 kW peak power.

FIG. 9 is a graph 900 of an air temperature 902 against a time 904 over 20 hours of operation proximate an optical amplification system launching an input beam into an input end of a 3C fiber coil, with the input beam being linearly polarized and having the linear polarization aligned with the fast-axis of the 3C fiber of the 3C fiber coil and producing an output beam with approximately 180 kW peak power. The air temperature 906 varies by approximately ±1.2° with an average cycle time of approximately 1.5 hours, according to normal laboratory HVAC cycling in ambient conditions. Measurements (not shown) of the temperature of plates used to secure the 3C fiber coil and optical pump stages also show similar time behaviors of heating and cooling, but with smaller temperature swings around ±0.5°.

Figure 10:
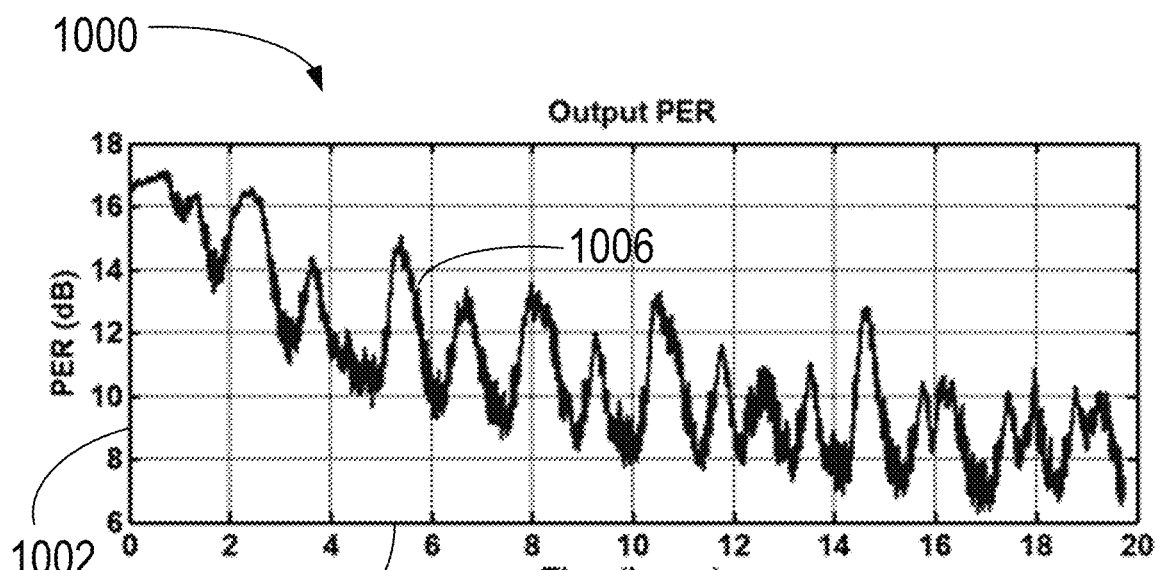
FIG. 10 is a graph of output PER against time for a fast-axis launch at 180 kW peak power.

FIG. 10 is a graph 1000 of an output PER 1002 against a time 1004, corresponding to the time period shown in FIG. 9, for the fast-axis input beam launch at approximately 180 kW peak power. The output PER 1006 unstably varies over time, and includes a correlation with system and local air temperatures, such as the air temperature 906. After cooldown, and re-initiation, the output PER recovered to an initial value of 16.5 db. Also, during extended operation and unstable output PER, by rotating an input λ/2 plate by 1°, the PER of the output beam could be partially recovered to approximately 14 dB. As the output peak power is decreased (e.g., from 180 kW to 150 kW, and to 100 kW), the PER values of the amplified output beam became progressively more stable. Similar results were obtained for slow-axis launch conditions producing output beams having signal peak powers of approximately 100 kW, 150 kW, and 180 kW.

Figure 11:
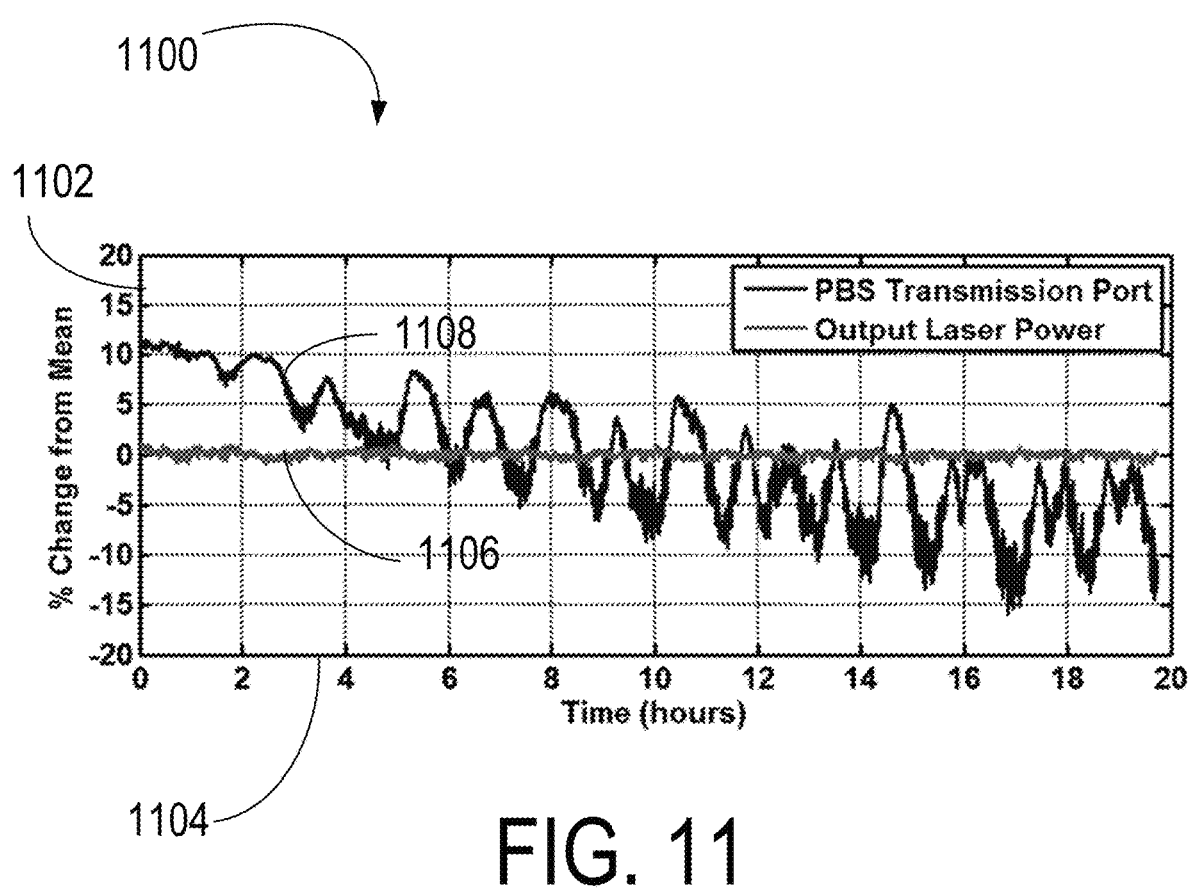
FIG. 11 is a graph of the percent change from mean against time for the output laser power and the polarizing beam splitter (PBS) port for a fast-axis launch.

FIG. 11 is a graph 1100 of a percent change from mean 1102 against a time 1104 for an output laser power 1106 and a power 1108 from the polarizing beam splitter (PBS) transmission port for the fast-axis launch shown in FIGS. 9-10. The total laser power 1106 is relatively stable (approximately ±0.5% peak-to-peak, equivalent to 0.34% standard deviation/mean value). However, for many applications, the transmission stability through the polarizing beam splitter (PBS) can be more important since this transmitted power represents the output power from a laser with a polarization-dependent isolator at the output. Thus, even with such a high degree of total laser power stability, the stability of the usable power is shown by curve 1108 can be substantially lower.

Initial Stabilization of Polarization Extinction Ratios—Circular Launch

Figure 12:
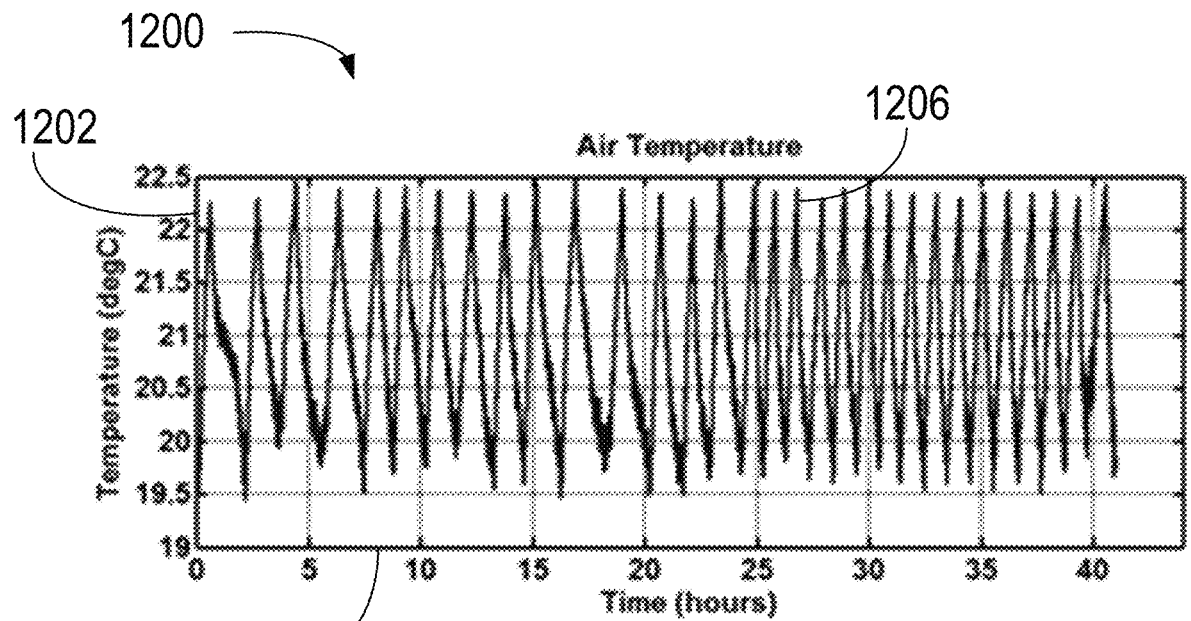
FIG. 12 is a graph of air temperature against time for a circular launch at 300 kW peak power.

FIG. 12 is a graph 1200 of an air temperature 1202 against time 1204 over more than 40 hours of operation of an optical amplification system that launches an input beam into an input end of a 3C fiber coil, with the polarization state of the input beam being circular, and producing an output beam having approximately 300 kW peak power in optical pulses of 40 ps duration (FWHM). An air temperature 1206 varies by approximately ±1.2° with an average cycle time of ~1.5 hours, similar to the variation shown in the graph 900.

Figure 13:
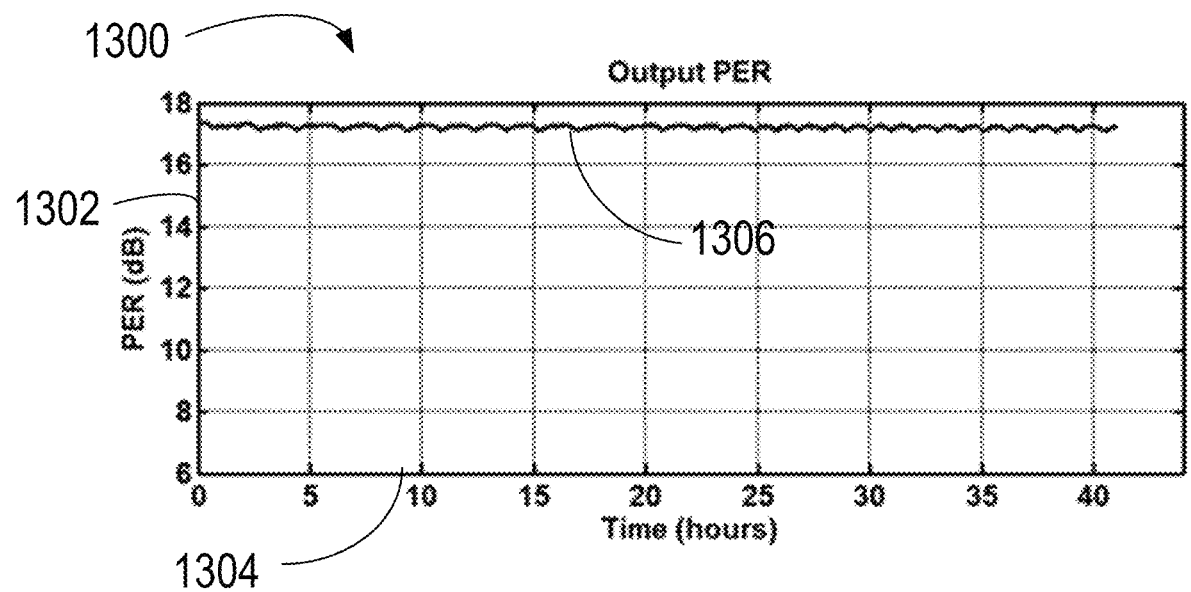
FIG. 13 is a graph of output PER against time for a circular launch at 300 kW peak power.

FIG. 13 is a graph 1300 of a PER 1302 for the 300 kW peak power output beam, against time 1304 using the circular polarization input launch condition. In contrast with the unstable and wandering output PER 1006 in graph 1000, for circular polarization, even at approximately 300 kW peak power, a PER 1306 of the 300 kW output beam is substantially constant (e.g., less than ±5%, less than ±2%, less than ±1%, less than ±0.5%) over a longer duration of operation.

Figure 14:
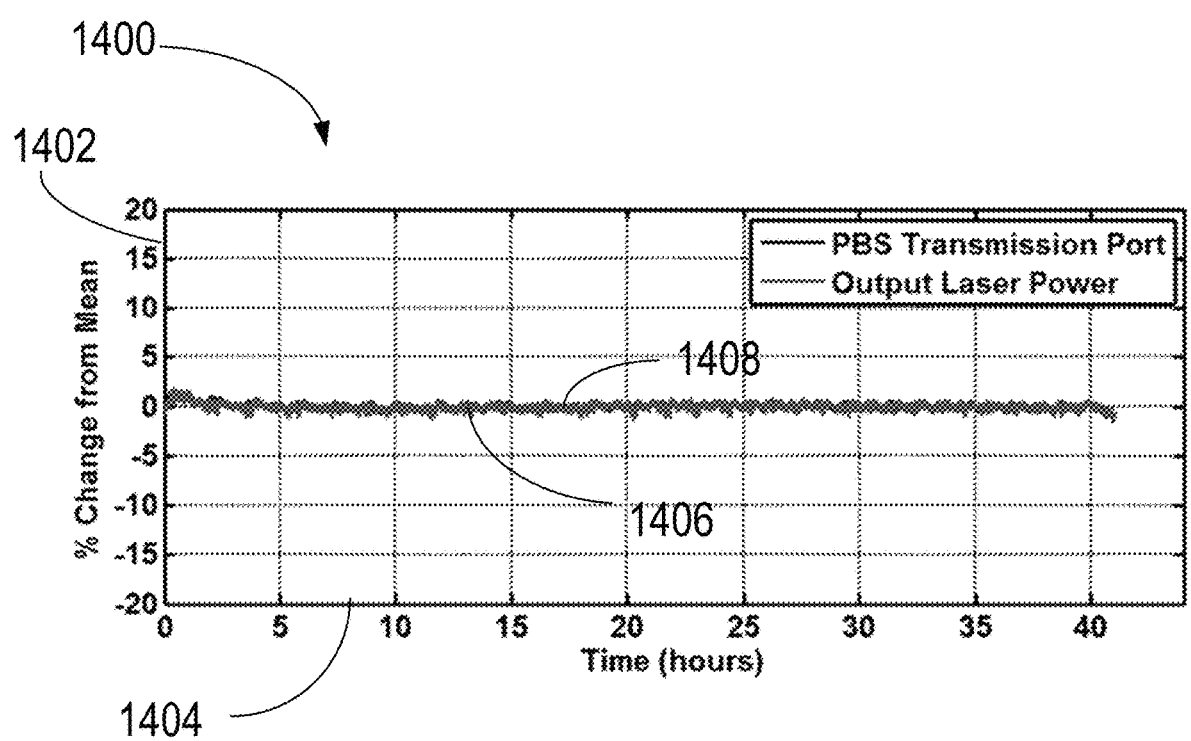
FIG. 14 is a graph of the percent change from mean against time for the output laser power and the polarizing beam splitter (PBS) port for a circular launch.

FIG. 14 is a graph 1400 of a percent change from mean 1402 against time 1404 for a total output laser power 1406 and a power 1408 from the polarizing beam splitter (PBS) transmission port, for an output beam produced with a circularly polarized launched input beam. In contrast with the situation in graph 1100, for circular polarization, even at approximately 300 kW peak powers of the output beam, both the total output laser power 1406 and the power 1408 out of the PBS are approximately the same (the two curves 1406 and 1408 are on top of each other in FIG. 14).

ADDITIONAL EXAMPLES

Figure 15:
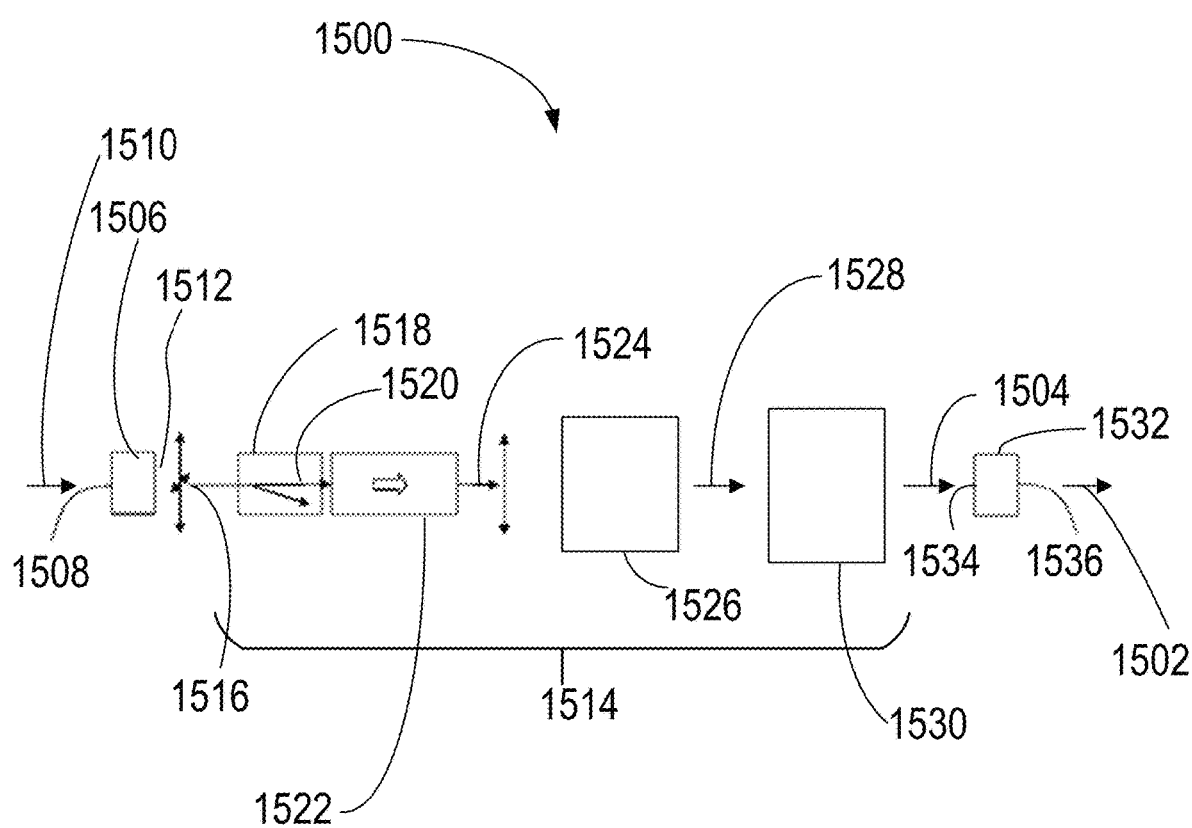
FIG. 15 is a schematic diagram of a fiber-coupled device.

FIG. 15 is an example fiber-coupled device 1500 configured to produce an stable amplified circularly-polarized output beam 1502 with a circularly-polarized input beam 1504, in accordance with some embodiments. In representative examples, a 12 μm diameter core polarization maintaining fiber (PMF) 1506 has an input surface 1508 configured to receive a seed input beam 1510, e.g., through free-space or a fiber splice. The PMF 1506 further includes an output surface 1512 optically coupled to a polarization converter 1514. A beam 1516 emitted from the output surface 1512 typically has a linear polarization state aligned with the polarization maintaining elements of the PMF 1506, but can include other polarization content as well. In some examples, the polarization converter 1514 includes a polarizing beam splitter (PBS) 1518 to further separate and redirect polarization content that is not aligned with a selected linear polarization axis, forming an intermediate beam 1520. The intermediate beam 1520 is directed through an optical isolator 1522 to further increase PER and producing a linearly polarized beam 1524 (e.g., with vertical arrow indicating linear polarization axis). The polarization converter 1514 can also include a half-wave plate 1526 that can be rotatable so as to selectively change the polarization direction of the linearly polarized beam 1524, producing a linearly polarized rotated beam 1528. The half-wave plate 1526 can also be used to further improve PER of a linear polarization state. The polarization converter 1514 also includes a quarter-wave plate 1530 configured to produce the circularly polarized beam 1504 from the linearly polarized rotated beam 1528. The circularly polarized beam 1504 is coupled into an active 3C fiber (e.g., having a 34 μm active core) 1532 having an input surface 1534 and an output surface 1536, with the stable amplified circularly-polarized output beam 1502 being emitted from the output surface

1536. In representative examples, the 3C fiber 1532 is coiled without twist or with a selected reduced amount of twist as discussed in various examples herein. In some examples, the rotational orientations of the half-wave plate 1526 and quarter-wave plate 1530 may be manually or automatically controlled during or outside of producing the stable amplified circularly-polarized output beam 1502 to increase PER or PER stability over time. An additional quarter-wave plate and half-wave plate combination can be used to convert the circular polarization state of the stable amplified circularly-polarized output beam 1502 into a linear polarization state aligned along a selected azimuth angle relative to the propagation direction of the beam 1502, or into an elliptical state. In some examples, the polarization converter 1514 can be a device that can be an in-line fiber-coupled device, coupled to the PMF 1506 and the 3C fiber 1532 via free-space optics or fiber splices (e.g., fusion splices).

Figure 16:
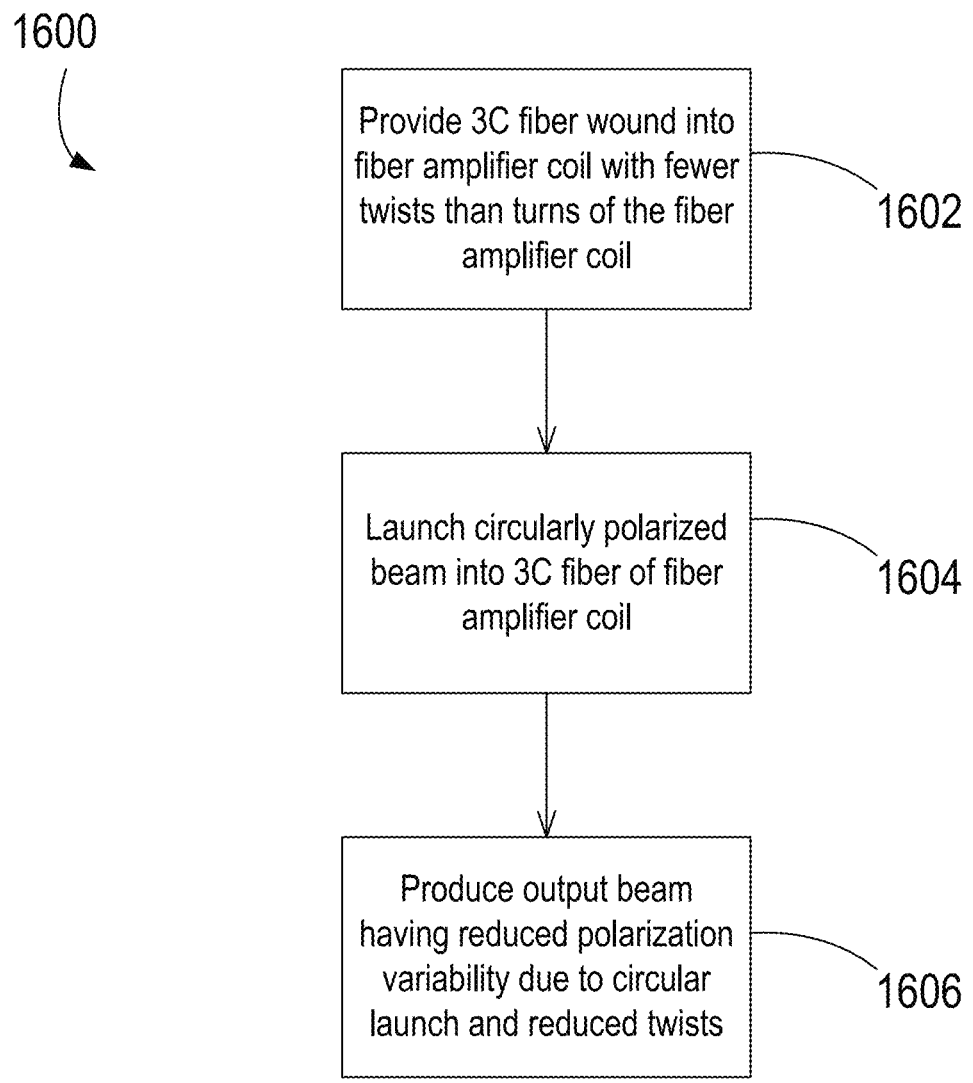
FIG. 16 is a flowchart of a method to reduce polarization state variability.

FIG. 16 shows an example method 1600 for reducing polarization state instability. At 1602, a 3C fiber amplifier coil is provided such that there are fewer twists (when extending the ends of the 3C fiber into a straight configuration) in the fiber amplifier coil than turns of the 3C fiber forming the fiber amplifier coil. At 1604, a circularly polarized beam is launched into the 3C fiber of the 3C fiber amplifier coil, and at 1606, the circularly polarized beam is amplified with the 3C fiber amplifier coil to form an amplified output beam having a reduced polarization variability due to the circular polarization state used for launch and the reduced number of twists of the 3C fiber relative to turns of the coil.

Figure 17:
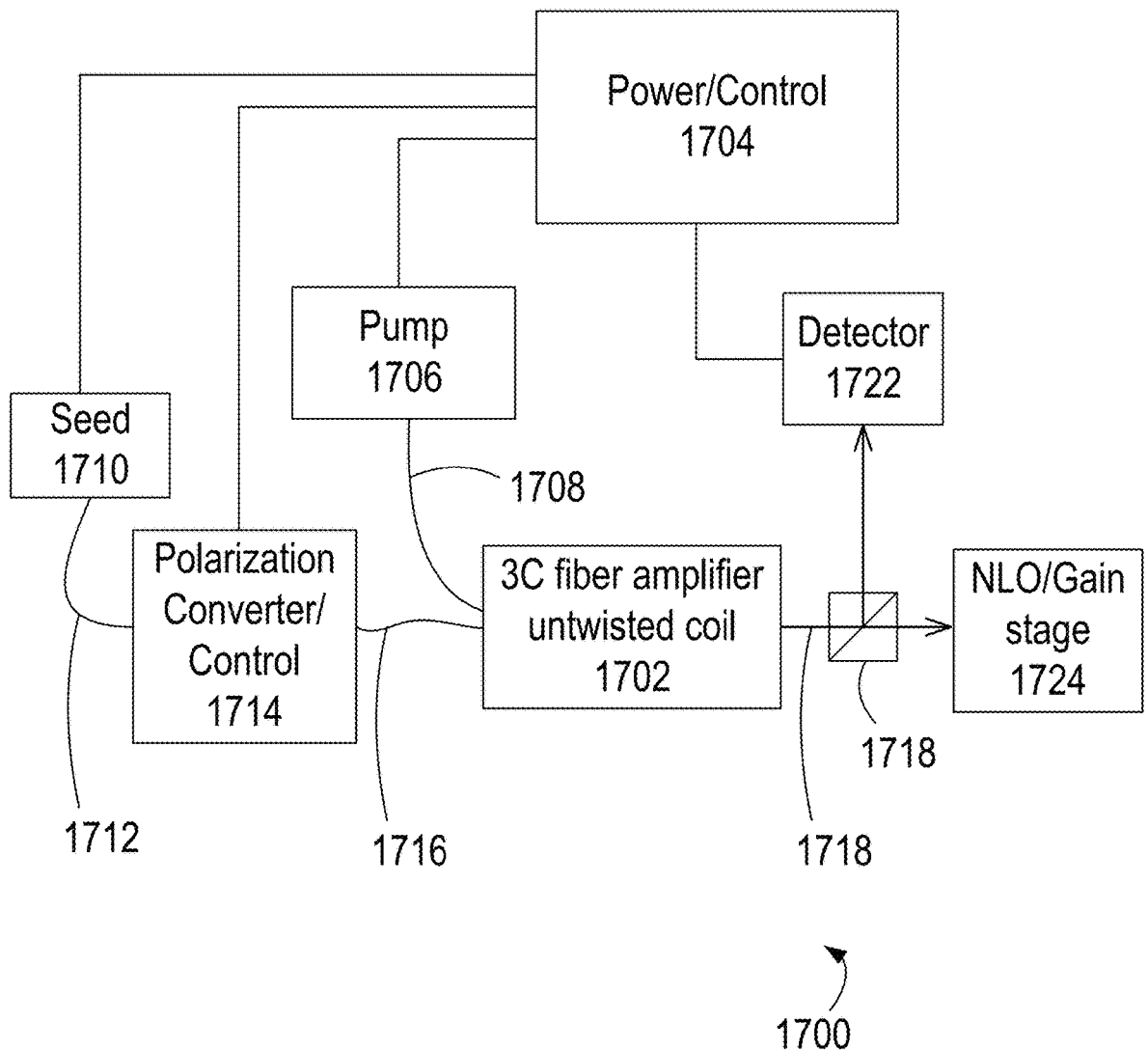
FIG. 17 is a schematic diagram of a laser amplification system.

FIG. 17 shows a fiber amplifier system 1700 that can be used to generate optical pulses with substantial peak powers (e.g., 150 kW or greater, 180 kW, or greater, 200 kW or greater, 250 kW or greater, 300 kW or greater, etc.), diffraction limited or near diffraction limited beam quality (e.g., $M^2 \le 1.05$, $M^2 \le 1.1$, $M^2 \le 1.2$, $M^2 \le 1.5$, etc.) and stable polarization state from pulse to pulse (e.g., 5 minutes or greater, 1 hour or greater, 10 hours or greater, 20 hours or greater, 40 hours or greater, etc.) and within the short duration of the optical pulses (e.g., 10 ps or smaller, 25 ps or small, 40 ps or smaller 50 ps or smaller, 100 ps or smaller, etc.). The fiber amplifier system 1700 includes a 3C fiber coiled without twist to form an untwisted 3C fiber amplifier coil 1702. A power/control 1704 is coupled to an optical pump 1706 and configured to energize the optical pump 1706 and control pump power output. The optical pump 1706 is typically a fiber-coupled laser diode package, though other pump sources can be used, and delivers optical pump energy along a pump fiber 1708 to the untwisted 3C fiber amplifier coil 1702. A seed laser source 1710 is situated to produce and couple a seed beam into an optical fiber 1712. A polarization converter/controller 1714 is situated to receive the seed beam and to convert and/or control the polarization state of the seed beam such that at least an input beam with a circular polarization state is coupled into an input fiber 1716. The input beam is coupled into the untwisted 3C fiber amplifier coil 1702 and becomes amplified to produce an amplified output beam 1718. A portion of the amplified output beam can be directed, e.g., with a beam splitter cube 1720, to an optical detector 1722. Characteristics of the detected portion, such as power, polarization state, etc., can be used by the power/control to adjust polarization state of the input beam directed into the untwisted 3C fiber amplifier coil 1702. The seed laser source 1710 can also be controlled by the power/control 1704, so as to vary optical pulse timing, output power, repetition rate, etc. The amplified output beam 1718 can be used directly in various material processing applications or can be coupled to subsequent one or more subsequent gain stages or non-linear optical crystals 1724, etc. It will be appreciated that various other system configurations and additional components can be used, including polarization isolators, counter-directed pumps, beam combiners, beam modulators, lenses, reflectors, free-space optics, etc.

Figure 18:
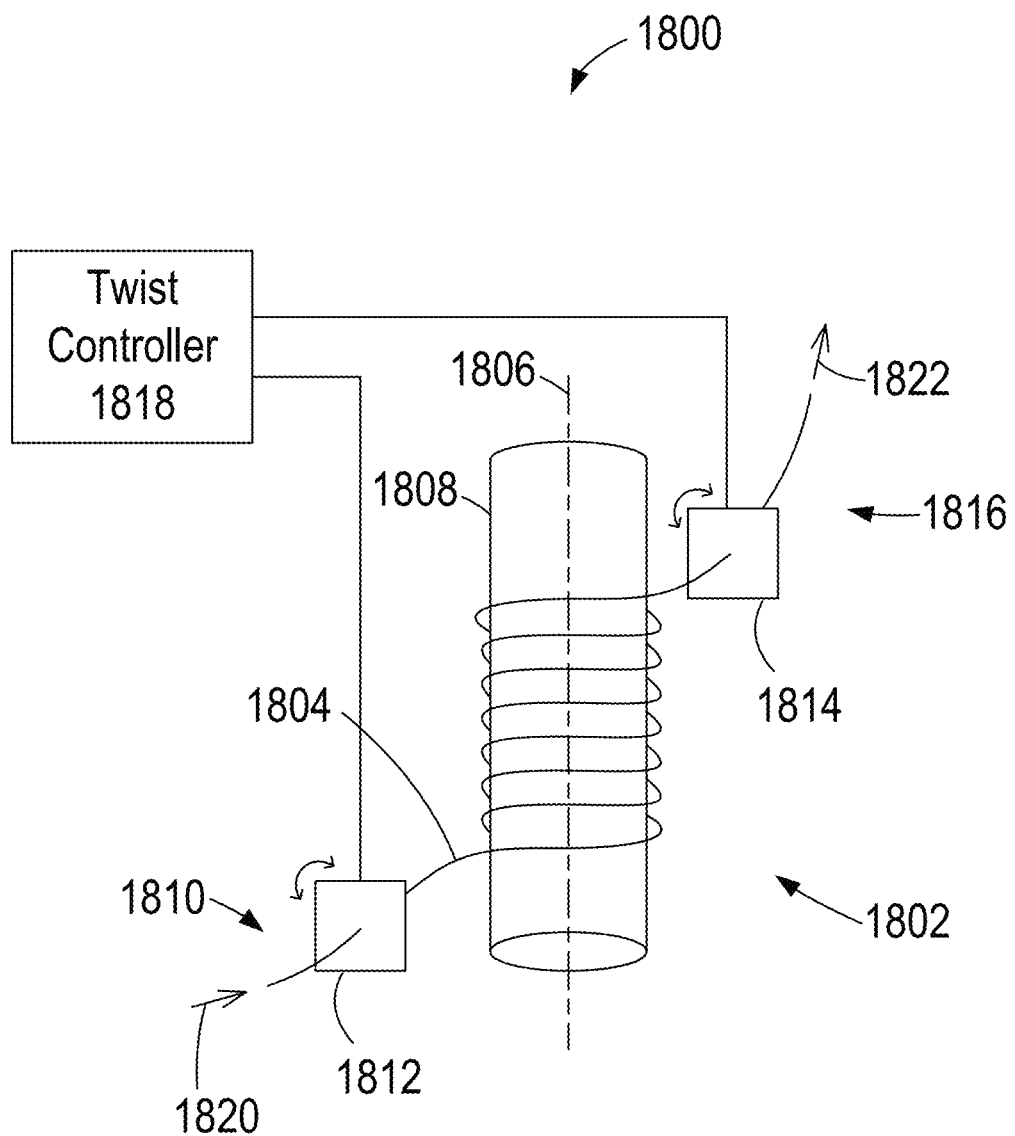
FIG. 18 is a schematic of a twist-controlled optical fiber coil.

FIG. 18 shows a twist-control system 1800 that includes a 3C amplifier coil 1802 of a 3C optical fiber 1804 wound about a coiling axis 1806 on a cylindrical mandrel 1808. An input end 1810 of the 3C optical fiber 1804 is coupled to a rotation stage 1812 or other optical fiber rotator that is situated to rotate the 3C optical fiber 1804 about a longitudinal optical axis of the 3C optical fiber 1804. Alternatively or additionally, another rotation stage 1814 can be coupled to an output end 1816 of the 3C optical fiber to produce a rotation of the 3C optical fiber about its longitudinal axis at the output end 1816. The rotation stages 1812, 1814 are coupled to an optical fiber twist controller 1818 that can adjust a twist in the optical fiber 1804. An input beam 1820 can be directed through the input end 1810 (e.g., through free-space or a preceding spliced fiber) to become amplified by propagation along the 3C fiber coil 1802 to form an amplified output beam 1822 that is directed out the output end 1816. The rotation of the input end 1810 and/or output end 1816 can be adjusted to change a number of twists of the 3C optical fiber 1804 to vary or control a polarization state stability of the amplified output beam 1822.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Optical fibers or other optical waveguides are generally based on a variation of refractive index as a function of distance from a propagation axis. Such refractive index variations include so-called index steps such as those associated with typical step index fibers and continuous variations such as those associated with typical gradient index fibers. Many convenient examples are based on optical fibers having circular cross-sections. Such fibers generally include a central core that is surrounded by a cladding region and the core and cladding are selected to provide guided wave propagation. In the examples disclosed below, optical fibers, optical fiber sections, preforms, and waveguide devices are shown as extending along linear axes. It will be appreciated that fibers and preforms can be arranged on curved, segmented, or axes of other configurations. Typically, such devices extend along propagation axes along which optical radiation propagates in the device, and such axes can be linear or curved.

In some embodiments, multimode or single mode devices are described, but by suitable selection of device characteristics such as core and cladding refractive indices (or refractive index difference) and dimensions, multimode or single mode devices can be fabricated. Propagation characteristics can be based on step index or gradient index designs. For convenient illustration, sectional views of fibers and preforms are provided. While in many useful examples, fiber and preform cross-sections are circular, oval, elliptical, polygonal or other cross-sections can be used. In addition, in some examples, stress rods or other core features can be provided.

The disclosed embodiments generally pertain to fibers that have a single core surrounded by a cladding layer. However, in other examples, additional cladding layers can be provided. Refractive indices and refractive index profiles for these layers can be selected to provide selected waveguide characteristics. In some examples, double clad fibers include an actively doped core that can be configured to support single mode propagation. The active core and the inner cladding can serve to guide pump radiation into the active gain element of the core. Typically the core has a higher refractive index than the inner cladding, and the inner cladding has higher refractive index than the outer cladding. Active fiber dopants can include rare earth metals such as Er, Yb, Tm, Ho, and Nd, to name a few, and other optically active metals including Bi. Passive fiber dopants can include other metals including Ge and Al, and various other multiple-ion-codoped combinations. Active and passive fiber dopants can have a radial doping concentration distribution that is flat, linear, parabolic, or arbitrary, to name a few. Other fiber types and associated preforms can be made in the same manner, including polarization maintaining fibers that generally include stress elements situated in a cladding layer so as to produce birefringence. Polarization maintaining fibers can be configured to support linear, circular, elliptical, radial, azimuthal, and/or complex polarization states, or any combination thereof.

In view of the many possible embodiments to which the principles of the disclosed technology may be applied, it should be recognized that the illustrated embodiments are only preferred examples and should not be taken as limiting the scope of the disclosed technology. Rather, the scope of the disclosed technology is defined by the following claims. We therefore claim all that comes within the scope of these claims.

I claim:

1. An apparatus, comprising:
a 3C fiber wound a number of turns in a single direction about a coiling axis between an input end and an output end of the 3C fiber to form a 3C fiber coil such that a number of twists in the 3C fiber with the input end and output end extended to form a straight fiber configuration is smaller than the number of turns, wherein the input end is situated to receive a beam with an input circular polarization state and the wound 3C fiber is configured to amplify the beam to produce an amplified output beam with an output circular polarization state and to reduce a polarization state variability of the output circular polarization state based on the smaller number of twists and the input circular polarization state.

2. The apparatus of claim 1, wherein the 3C fiber includes an actively doped core configured to amplify an input beam propagating from the input to the output end.

3. The apparatus of claim 2, further comprising a seed source optically coupled to the input end of the 3C fiber and configured to generate a seed beam that becomes the amplified output beam.

4. The apparatus of claim 3, further comprising a pump source optically coupled to the input end and/or the output end of the 3C fiber and configured to optically pump the actively doped core of the 3C fiber.

5. The apparatus of claim 4, further comprising an input polarization converter including a half-wave plate situated to receive the seed beam and to adjust an angle of a linear polarization state of the seed beam and including a quarter-wave plate situated to receive the seed beam with the angled-adjusted linear polarization state and to change the linear adjusted polarization state to the input circular polarization state.

6. The apparatus of claim 5, further comprising a polarization maintaining fiber situated to receive the seed beam from the seed source and to direct the seed beam to the input polarization converter.

7. The apparatus of claim 6, wherein the input polarization converter is fiber spliced at an input end to the polarization maintaining fiber and at an output end to the input end of the 3C fiber.

8. The apparatus of claim 5, further comprising an output polarization converter including a quarter-wave plate situated receive the amplified output beam and to change the output circular polarization state of the amplified output beam to a linear polarization state and including a half-wave plate situated to receive the amplified output beam with the linear polarization state and to adjust an angle of the linear polarization state of the amplified output beam.

9. The apparatus of claim 1, further comprising an optical fiber rotator coupled to at least one of the input end or the output end of the 3C optical fiber and configured to rotate the corresponding input end or output end to selectively vary the number of twists.

10. The apparatus of claim 1, wherein the 3C fiber coil is a right-handed coil.

11. The apparatus of claim 1, wherein the 3C fiber coil is a left-handed coil.

12. The apparatus of claim 1, wherein the 3C fiber includes a reference marking on an exterior surface of the 3C fiber between the input end and the output end to provide an indication of a twisting of the 3C fiber.

13. The apparatus of claim 1, wherein the number of turns is one or greater, and the number of twists is zero.

14. The apparatus of claim 1, wherein a number of quasi-twists of the 3C fiber in the 3C fiber coil is uniformly provided between the input end and output end.

15. The apparatus of claim 1, wherein the polarization state variability corresponds to a time-dependent variation in polarization extinction ratio during an optical pulse and/or over multiple optical pulses.

16. The apparatus of claim 1, further comprising a subsequent gain stage coupled to the amplified output beam and configured to amplify the amplified output beam.

17. The apparatus of claim 1, further comprising a non-linear optical element situated to receive the amplified output beam and to produce a non-linearly converted optical beam.

18. A method, comprising:
coupling a circularly-polarized input beam into a 3C fiber wound a number of turns in a single direction about a coiling axis between an input end and an output end of the 3C fiber to form a 3C fiber coil such that a number of twists in the 3C fiber with the input end and output end extended to form a straight fiber configuration is smaller than the number of turns; and
amplifying the input beam having the input circular polarization state to produce an amplified output beam with an output circular polarization state having a reduced polarization state variability based on the smaller number of twists and the input circular polarization state.

19. The method of claim 18, further comprising adjusting the number of twists to reduce the polarization state variability of the amplified output beam.

20. The method of claim 18, further comprising optically pumping the 3C fiber with a pump source.

21. The method of claim 18, wherein the polarization state variability corresponds to a time-dependent variation in polarization extinction ratio during an optical pulse and/or over multiple optical pulses.

* * * * *